(12) United States Patent
Chio

(10) Patent No.: US 6,880,677 B2
(45) Date of Patent: Apr. 19, 2005

(54) ELASTIC ENERGY STORAGE DEVICE

(76) Inventor: Chuy-Nan Chio, 235 Chung-Ho Box 8-24, Taipei (TW)

( * ) Notice: Subject to any disclaimer, the term of this patent is extended or adjusted under 35 U.S.C. 154(b) by 191 days.

(21) Appl. No.: 10/194,515

(22) Filed: Jul. 15, 2002

(65) Prior Publication Data

US 2004/0007427 A1 Jan. 15, 2004

(51) Int. Cl.[7] .................................................. F03G 1/00
(52) U.S. Cl. ............................ 185/38; 185/37; 185/10; 185/39
(58) Field of Search ............................. 182/10, 37, 38, 182/39, 40 B, 45, 41 R, 40 R

(56) References Cited

U.S. PATENT DOCUMENTS 5,590,741 A * 1/1997 Storms ........................ 185/10
6,648,050 B1 * 11/2003 Toti ............................ 160/170
2002/0033240 A1 * 3/2002 Toti ............................ 160/170
2003/0066713 A1 * 4/2003 Nagao et al. ................. 185/37

* cited by examiner

Primary Examiner—David M. Fenstermacher

(57) ABSTRACT

An elastic energy storage device has an energy storage unit which has an axial rod penetrating through a plurality of rotary disks and spiral springs. One side of each rotary disk is protruded with an outer edge buckling post and another side thereof is installed with an inner edge buckling post. Each two rotary disks are installed with a spiral spring. The casing is installed with a unidirectional power output shaft for driving the first rotary disk of the energy storage unit to rotate. The speed change box has an input shaft and an output shaft. The input shaft is connected or engaged to the rotary disk; and one of the rotary disks of the energy storage unit at an innermost side has a function of driving the input shaft to rotate. Thereby, the at least one spiral spring stores energy through a flywheel and then release the energy steadily.

2 Claims, 9 Drawing Sheets

ELASTIC ENERGY STORAGE DEVICE

BACKGROUND OF THE INVENTION

1. Field of the Invention

The present invention relates to energy storage device, and particularly to an elastic energy storage device having a plurality of spiral springs and a flywheel for storing energy and then releasing the energy steadily.

2. Description of Related Art

Referring to FIGS. 1 and 2, a portable manual generator is disclosed in Taiwan Patent No. 86208974. This prior art includes a casing, a generator, a driving portion, and an actuating portion. The driving portion includes a plurality of gears. One side of the actuating portion is engaged to the gear of the driving portion and another side thereof protrudes out of the casing. A lower end of the actuating portion has an elastic element which drives the actuating portion to moving reciprocally. Thereby, when the driving portion is pressed continuously, the gear of the driving portion can be driven and then the gear of the driving portion drives the generator so that the rotor of the generator rotates with a high speed to generate electric power. However, the power generated by this way can not be stored and thus the user must press the actuating portion continuously for generating power. Once the user stops the operation, the power is interrupted. Moreover, since the electric power from the generator is generated by the manual action, if the user can not steadily operate the generator, then the output power and frequency is unstable.

SUMMARY OF THE INVENTION

Accordingly, the primary object of the present invention is to provide an elastic energy storage device, wherein the elastic energy storage device of the elastic energy storage device has a plurality of spiral springs and a plurality of flywheels so that the spiral springs store energy and then release the energy steadily.

To achieve above object, the present invention provides an elastic energy storage device comprising a casing, an energy storage unit and a speed change box. The energy storage unit and the speed change box are installed within the casing; the energy storage unit has an axial rod penetrating through a plurality of rotary disks and a plurality of spiral springs; one side of each rotary disk is protruded with an outer edge buckling post and another side thereof is installed with an inner edge buckling post; each two rotary disks is installed with a spiral spring; the inner edge buckling post and outer edge buckling post are buckled to two edges of the spiral spring; an outer side of the casing is installed with a unidirectional power output shaft for driving the first rotary disk of the energy storage unit to rotate; the speed change box has an input shaft and an output shaft; the output shaft protrudes out of the casing; the speed change box is installed with a plurality of gears therewithin; the input shaft is connected or engaged to the rotary disk of the energy storage unit; one of the rotary disks of the energy storage unit at an innermost side having a function of driving the input shaft to rotate.

The various objects and advantages of the present invention will be more readily understood from the following detailed description when read in conjunction with the appended drawing.

DETAILED DESCRIPTION OF THE PREFERRED EMBODIMENTS

Figure 1:
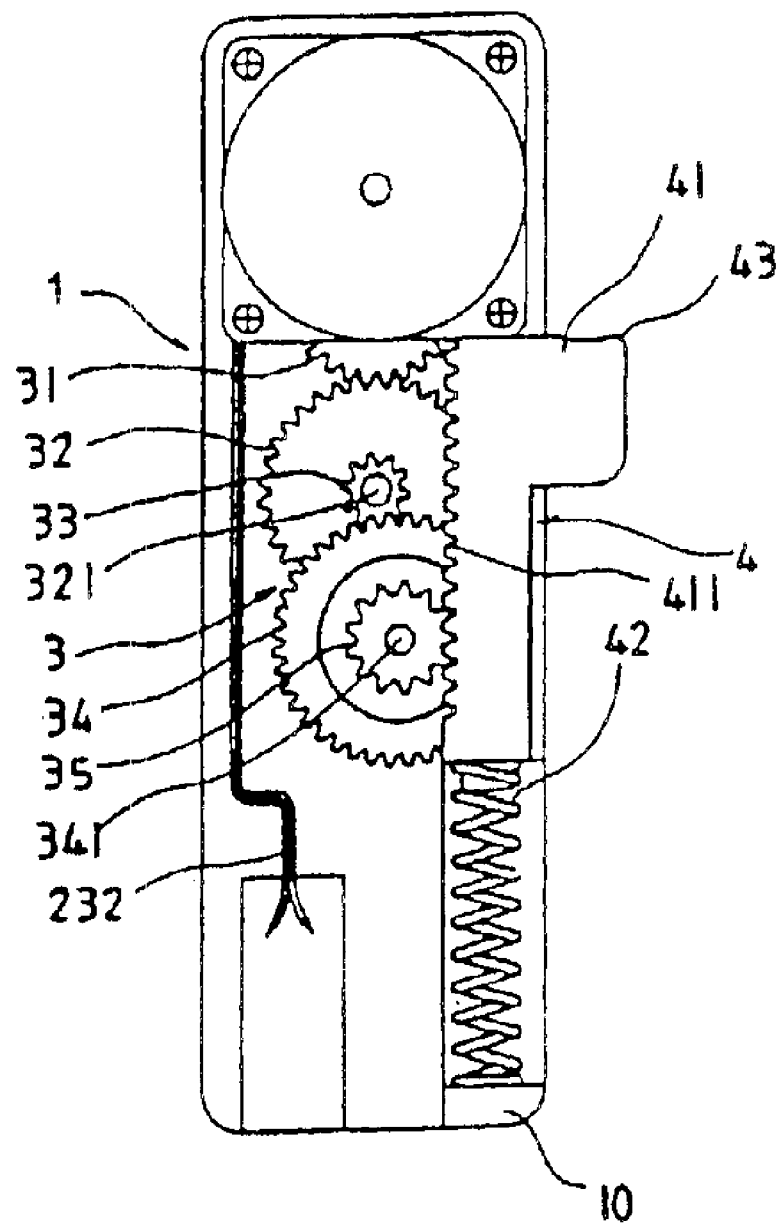
FIG. 1 is a cross section view of one prior art.
Figure 2:
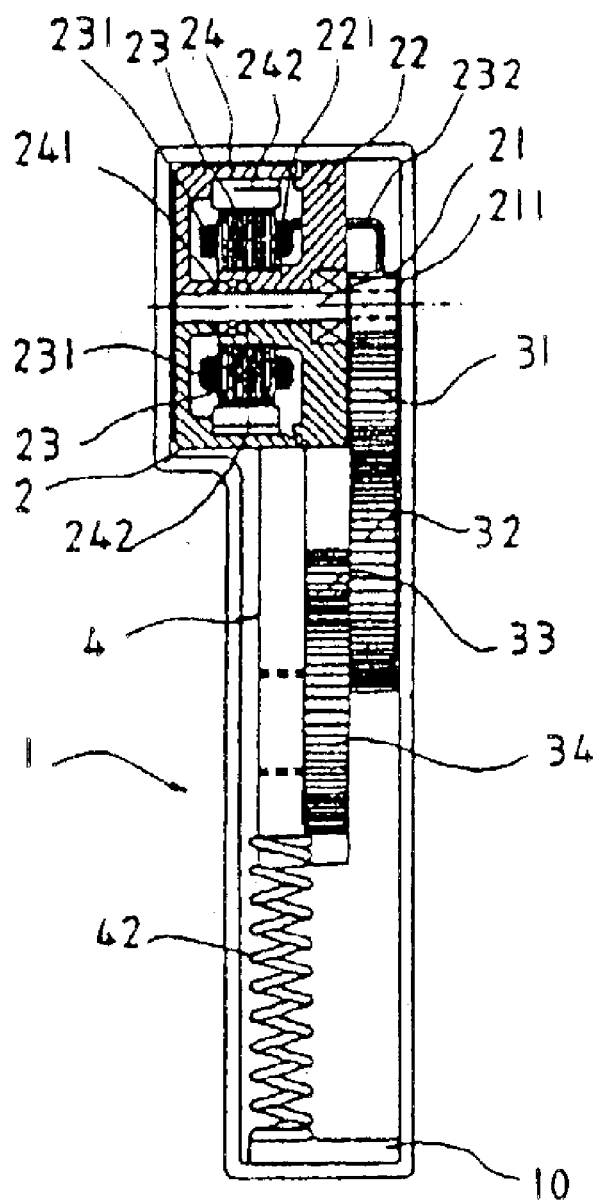
FIG. 2 is another cross section view of the prior art.
Figure 3:
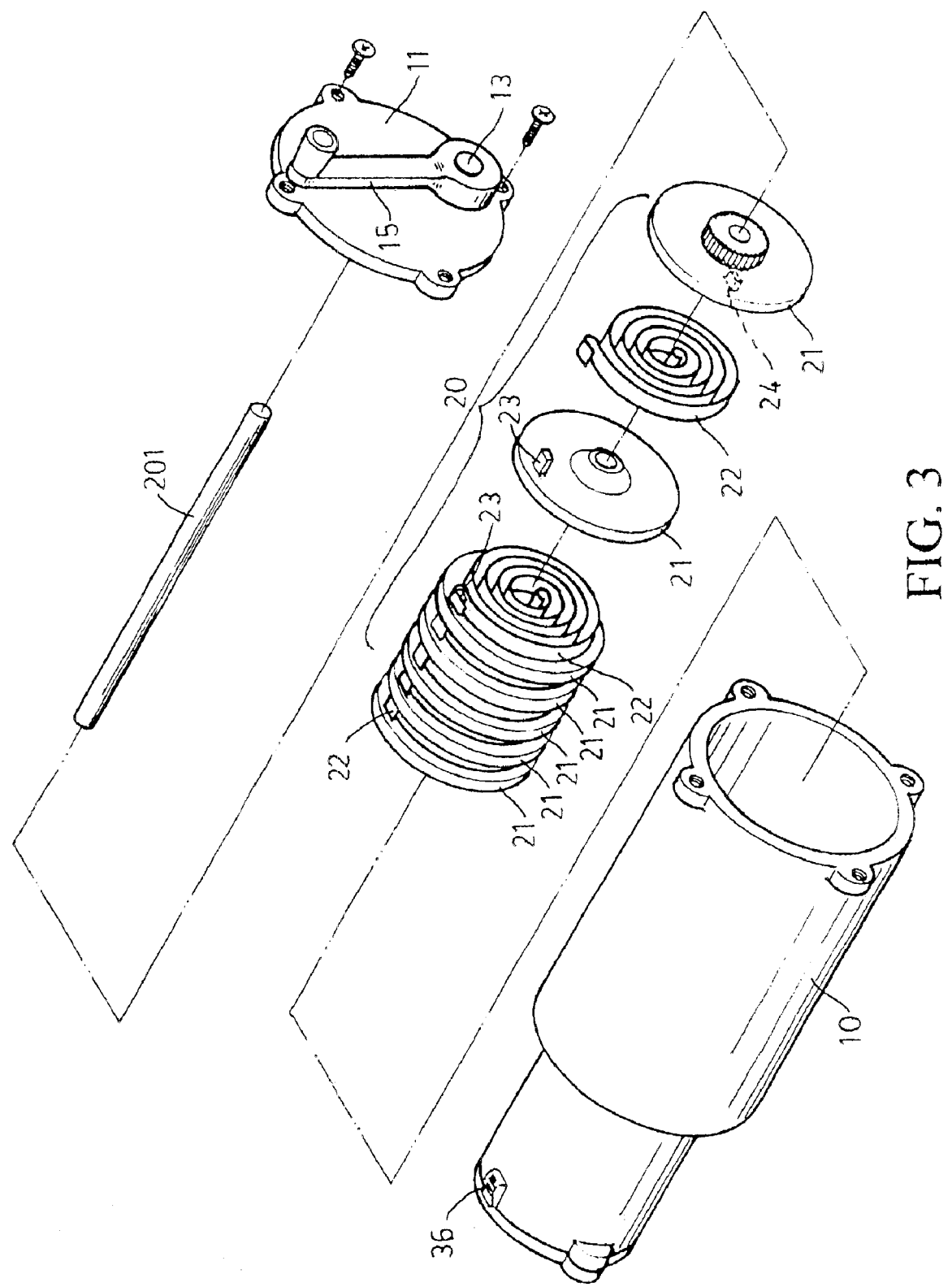
FIG. 3 is a perspective view of the present invention.
Figure 4:
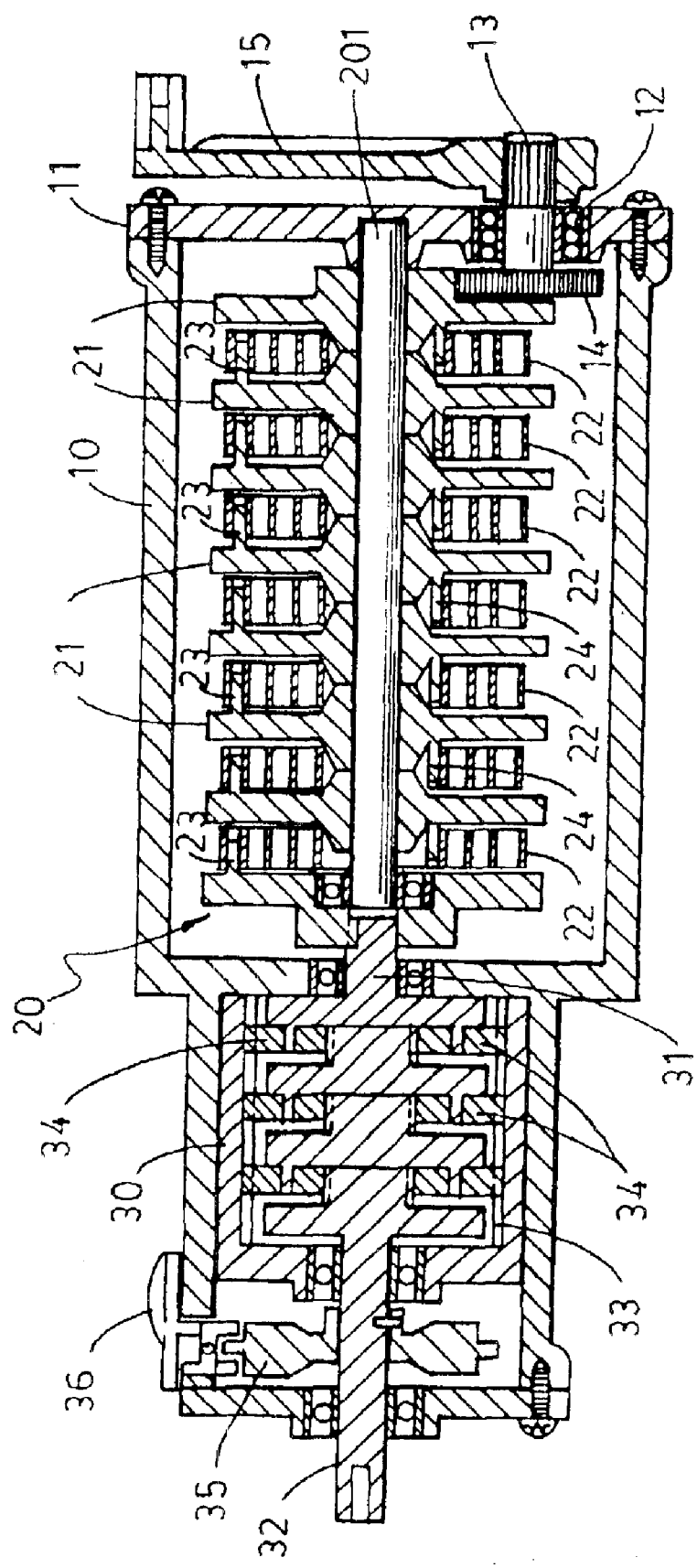
FIG. 4 is an assembled cross section view of the present invention.

Referring to FIGS. 3 and 4, an elastic energy storage device of the present invention is mainly formed by a casing 10, an energy storage unit 20 and a speed change box 30.

The casing 10, referring to FIGS. 3 and 4, has a cover piece 11 at an opened surface. The cover piece 11 has a unidirectional bearing 12 for installing a power transferring shaft 13. One end of the power transferring shaft 13 has a driven gear 14 and another end thereof is protruded from the casing 10 for being pivotally installed with a driving handle 15.

The energy storage unit 20, as illustrated in FIGS. 3 and 4, is installed at an interior of the casing 10. The energy storage unit 20 has an axial rod 201 penetrating through a plurality of rotary disks 21 and a plurality of spiral springs 22. One lateral surface of each rotary disk 21 is protruded with an outer edge buckling post 23 and another end thereof is installed with an inner edge buckling post 24. Each two rotary disks 21 are installed with a spiral spring 22. The inner edge buckling post 24 and outer edge buckling post 23 are buckled to the two edges of the spiral spring 22. Moreover, the rotary disk 21 at the outermost edge is engagable with the driven gear 14 of the power transferring shaft 13. The rotation of the power transferring shaft 13 can drive the rotary disk 21 at the outermost side to rotation.

Figure 5:
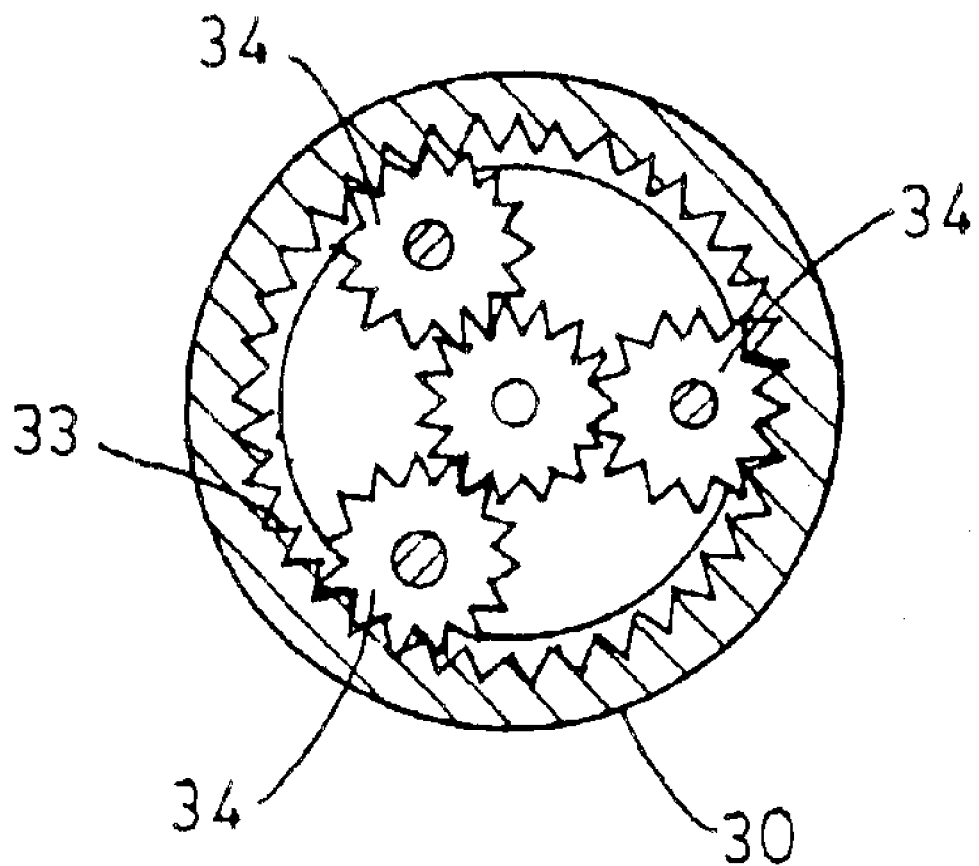
FIG. 5 is a longitudinal cross section view of the speed change box according to the present invention.

Referring to FIGS. 3, 4 and 5, the speed change box 30 is installed within the casing 10 and has an input shaft 31 and an output shaft 32. The output shaft 32 protrudes out of the casing 10. The inner wall of the speed change box 30 has inner gears 33. A plurality of outer gears 34 are installed within the casing. By designing the ratios of the gears, the rotary speeds of the two shafts 31 and 32 are different so as to increase the rotation speed. On the contrary, if the two shafts are interchanged, it has the function of deceleration. The input shaft 31 is connected (or engaged) to the rotary disk 21 of the energy storage unit 20. When the rotary disk 21 at the innermost side of the energy storage unit 20 rotates, the input shaft 31 will be driven to rotate. Moreover, the output shaft 32 can be installed with a flywheel 35. The energy is stored in the flywheel 35 and then the power in the flywheel 35 can be outputted steadily. Thereby, the output energy of the output shaft 32 can be outputted steadily. Furthermore, the flywheel 35 can be clamped by a brake 36.

Figure 6:
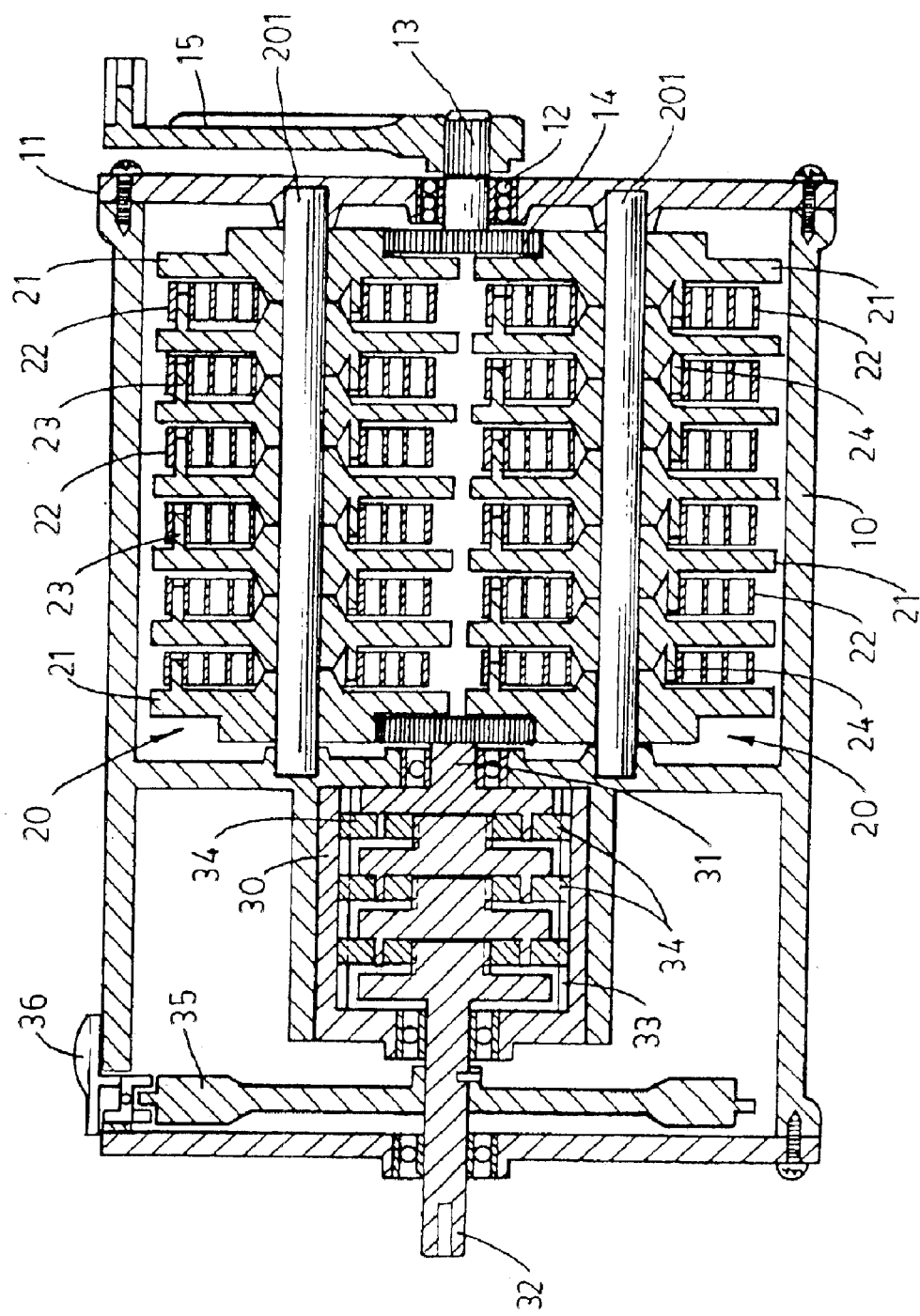
FIG. 6 is a schematic view showing that at least two energy storage units are connected in parallel in the present invention.
Figure 7:
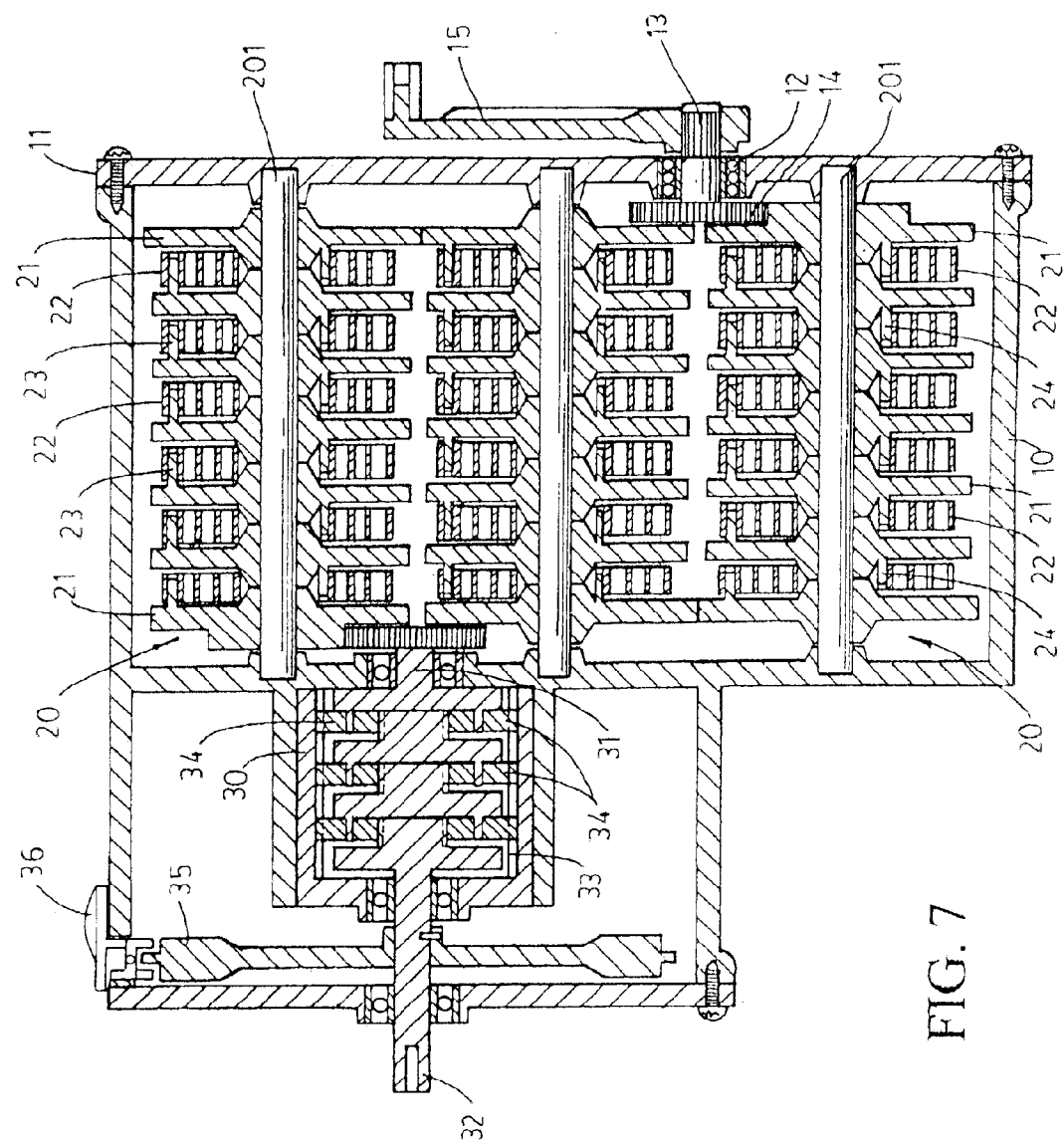
FIG. 7 is a schematic view showing that at least two energy storage units are connected in series in the present invention.
Figure 8:
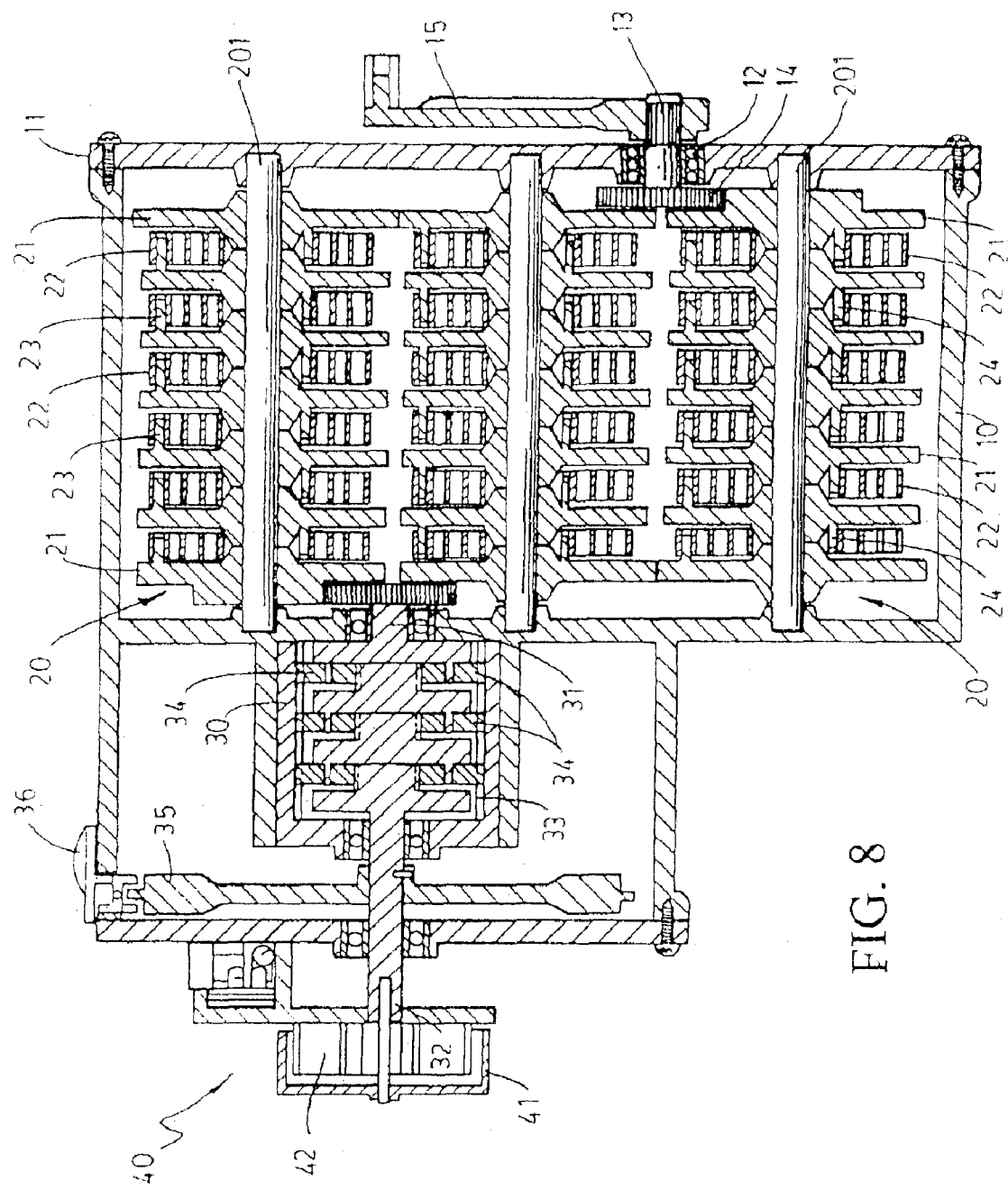
FIG. 8 is a schematic view showing that the present invention is applied to a generator.

By above mentioned components, the brake 36 can be resisted against the edge of the flywheel 35 so that the output shaft 32 and input shaft 31 of the speed change box 30 is motionless. The driving handle 15 at the outer side of the casing 10 is rotated so that the driven gear 14 at one end of the driven power transferring shaft 13 will rotate the rotary disk 21 at the outermost end of the energy storage unit 20 (rotate unidirectionally). Thereby, the rotary disk 21 will wind adjacent spiral springs 22. After the spiral springs 22 winds, the second rotary disk 21 will be driven to rotate. The second rotary disk 21 will drive the adjacent spiral springs 22. The process is repeated so that the plurality of spiral springs 22 of the energy storage unit 20 are wound to be in a condition for releasing energy. When the brake 36 is released from the edge of the flywheel 35, the output shaft 32 and the input shaft 31 of the speed change box 30 are also released. The plurality of spiral springs 22 of the energy storage unit 20 will release power. Thereby, the innermost rotary disk 21 connected to the input shaft 31 will drive the input shaft 31 of the speed change box 30 to rotate so that the output shaft 32 outputs power through the flywheel 35 with a higher rotary speed. Moreover, in the present invention, other than using one set of energy storage unit 20, as shown in the FIG. 4, in another embodiment of the present invention, at least two energy storage units 20 can be connected in parallel. The rotary disks 21 at the outmost sides of the energy storage units 20 are driven by the driven gear 14 of the casing 10, as shown in the FIG. 6. Thereby, the spiral springs 22 of the energy storage units 20 are wound and stored so as to store energy in the spiral springs 22. When the brake 36 is released, the energy storage units 20 will release energy at the same time so as to obtain higher driving twisting force. Moreover, as shown in the FIG. 7, at least two energy storage units 20 can be connected in series. That is, the driven gear 14 of the casing 10 is engaged to the outermost rotary disk 21 of the first energy storage unit 20 and then the innermost rotary disk 21 drives the second energy storage unit 20. The second energy storage unit 20 further drives the third energy storage unit 20. The process is repeated for other energy storage units 20. The spiral springs 22 of all the energy storage units 20 are wound to store energy. Then the rotary disk 21 of the last energy storage unit 20 is connected (or engaged) to the input shaft 31 of the speed change box 30. When the brake 36 is released, each energy storage unit 20 will release power at the same time so as to acquire higher transferring power (the power releasing time of the spiral spring 22 is prolonged).

Figure 9:
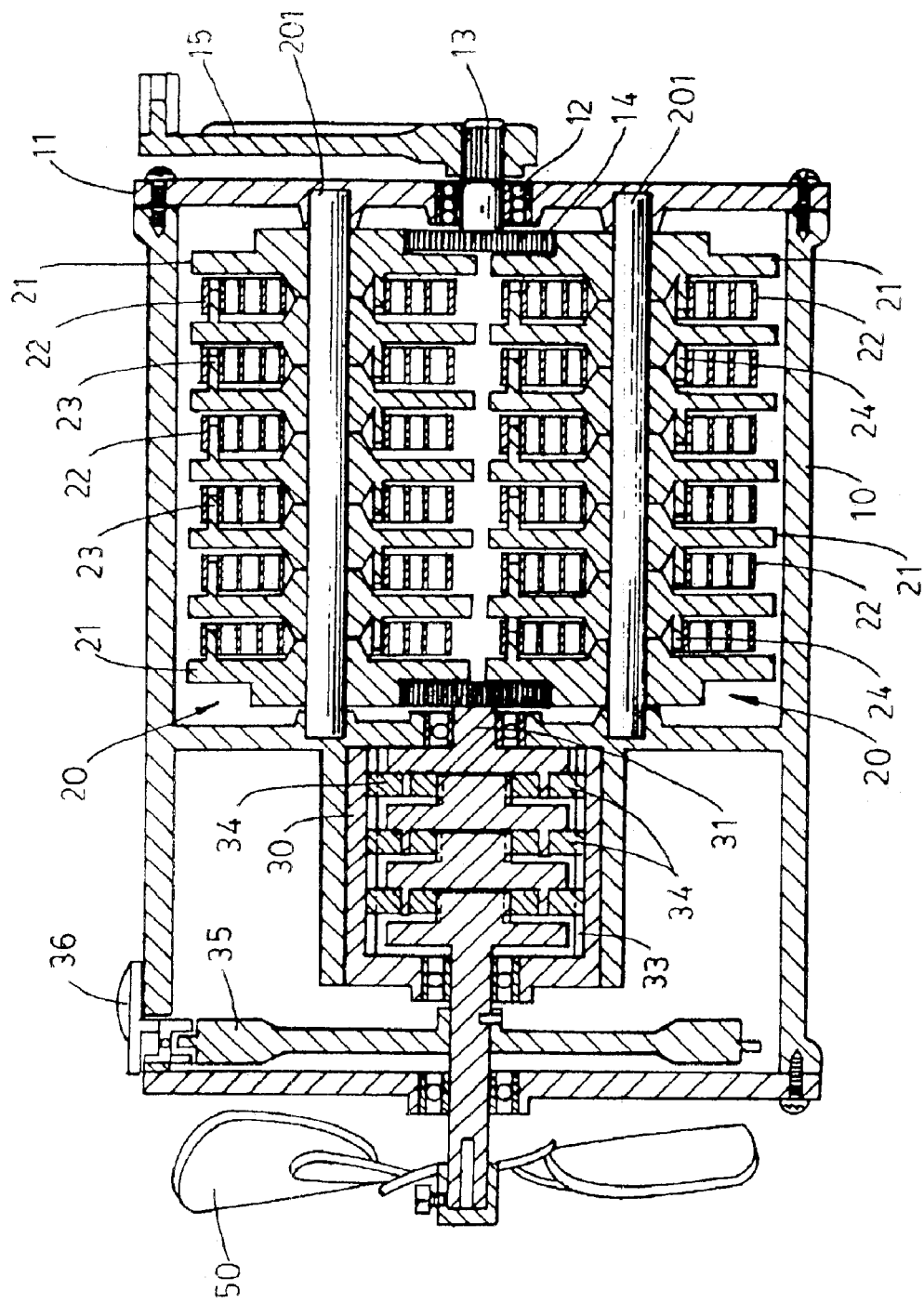
FIG. 9 is a schematic view showing that the present invention is applied to a fan.

Thereby, the transfer by the output shaft 32 can be applied to the following applications:

1. The rotary casing 41 of a generator 40 can be pivotally connected to the output shaft 32 of the speed change box 30. By the output shaft 32 to drive the rotary casing 41 to rotate with a high speed, the coils will generate electric power.
2. Blades 50 of a fan can be pivotally connected to the output shaft 32 of the speed change box 30, the fan 50 rotates and generate wind due to rotation of the output shaft 32, as shown in the FIG. 9.
3. The output shaft 32 of the speed change box 30 is pivotally connected to a rotary razor seat or as a power source of a toy car.

Moreover, if the present invention is as a machine with a larger output power, since a larger power is necessary to rotate a power output shaft 13, a motor can be used to substitute the driven handle 14.

Thereby, it is known from about description, in the present invention, at least one spiral springs is used to store energy, and the energy is released steadily by through a flywheel.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. An elastic energy storage device comprising
a casing,
an energy storage unit installed within the casing; the energy storage unit having an axial rod penetrating through a plurality of rotary disks and a plurality of spiral springs; one side of each rotary disk being protruded with an outer edge buckling post and another side thereof is installed with an inner edge buckling post; every two rotary disks being installed with a spiral spring; the inner edge buckling post and outer edge buckling post being buckled to the spiral springs;
a unidirectional power output shaft installed at an outer side of the casing for driving the first rotary disk of the energy storage unit to rotate;
a speed change box installed within the casing and having an input shaft and an output shaft; the output shaft protruding out of the casing; the speed change box being installed with a plurality of gears therewithin; the input shaft being connected or engaged to the rotary disk of the energy storage unit; one of the rotary disks of the energy storage unit at an innermost side has a function of driving the input shaft to rotate; and
thereby, the at least one spiral spring stores energy and then released the energy steadily;
a flywheel being installed to an output shaft of the speed change box for storing energy from the output shaft and releasing the energy steadily; the flywheel being braked by a brake.

2. The elastic energy storage device as claim in claim 1, wherein the power output shaft at the outer side of the casing is driven by a driving handle.

* * * * *